Sept. 9, 1969  E. E. CRIMM  3,465,970
SELF-LOADING AND UNLOADING LITTER SPREADER
Filed Feb. 15, 1967  4 Sheets-Sheet 1
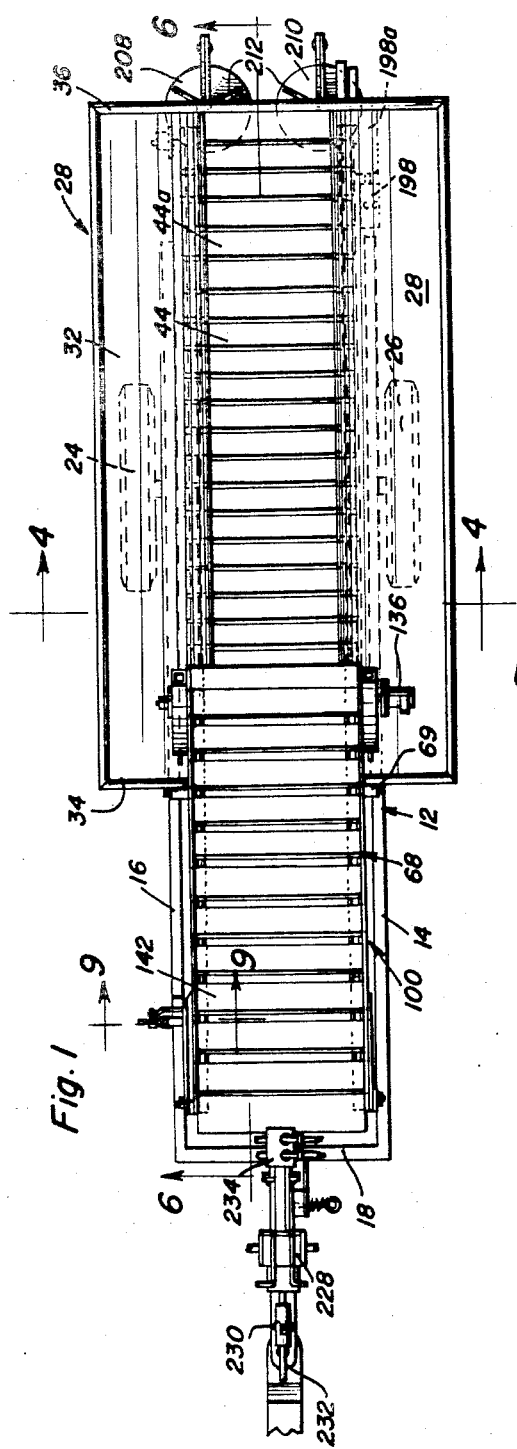
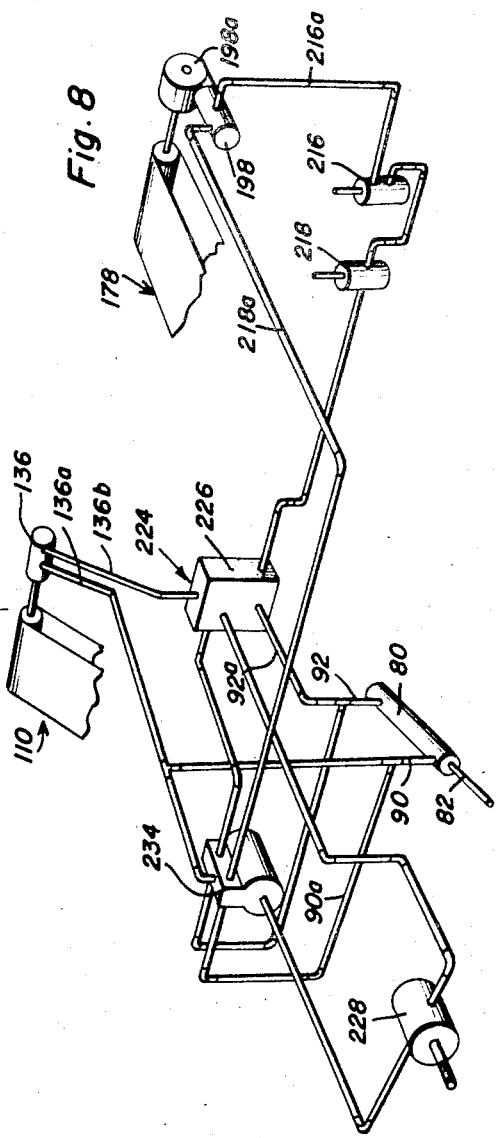
Elvie E. Crimm
INVENTOR.

Sept. 9, 1969    E. E. CRIMM    3,465,970
SELF-LOADING AND UNLOADING LITTER SPREADER
Filed Feb. 15, 1967    4 Sheets-Sheet 2
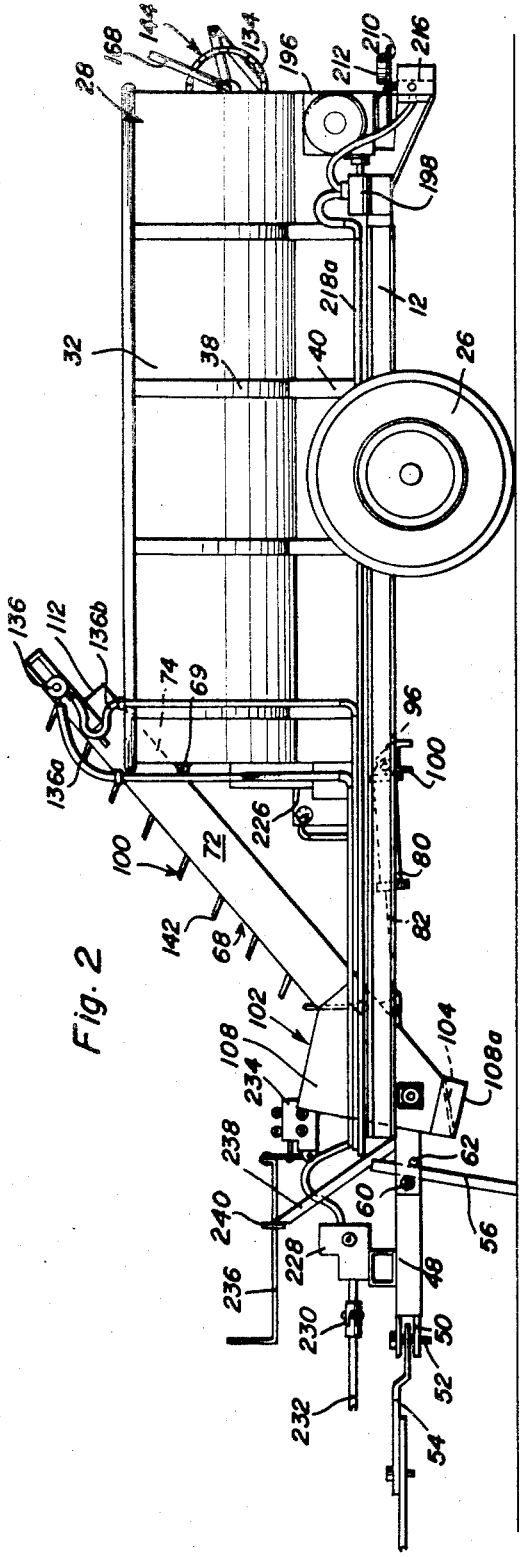
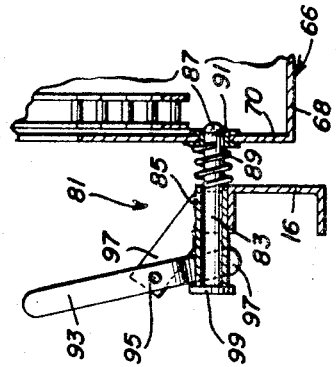
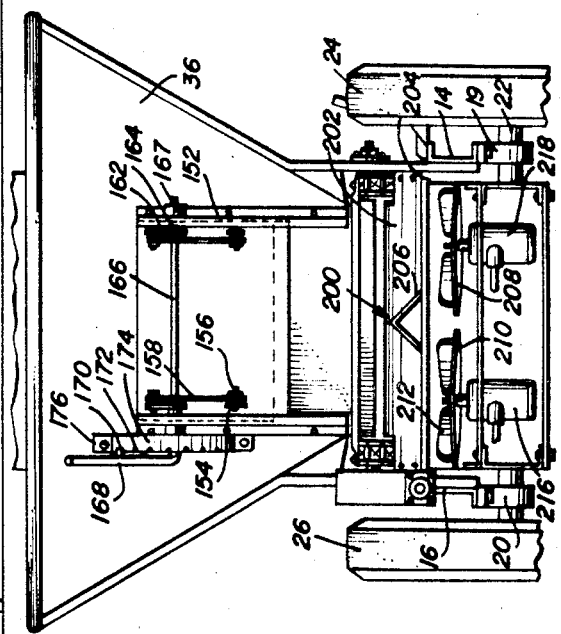
Elvie E. Crimm
INVENTOR.

Sept. 9, 1969  E. E. CRIMM  3,465,970
SELF-LOADING AND UNLOADING LITTER SPREADER
Filed Feb. 15, 1967  4 Sheets-Sheet 3
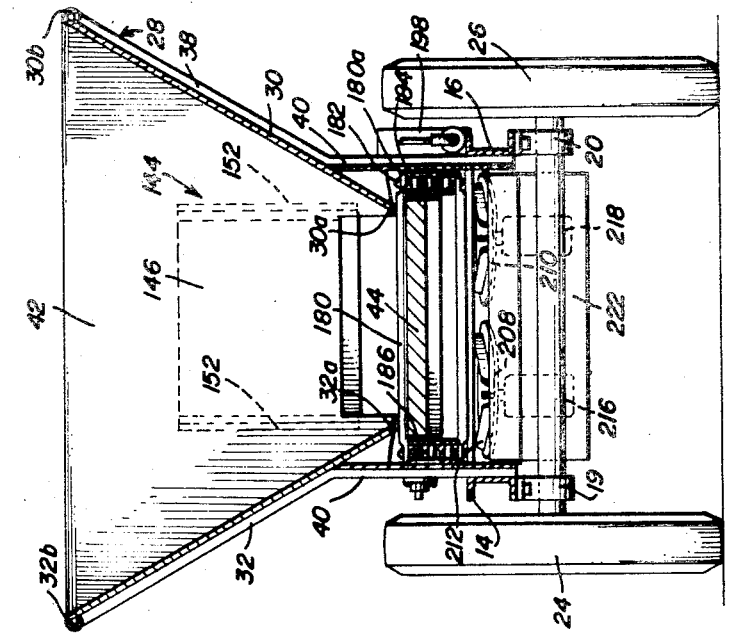
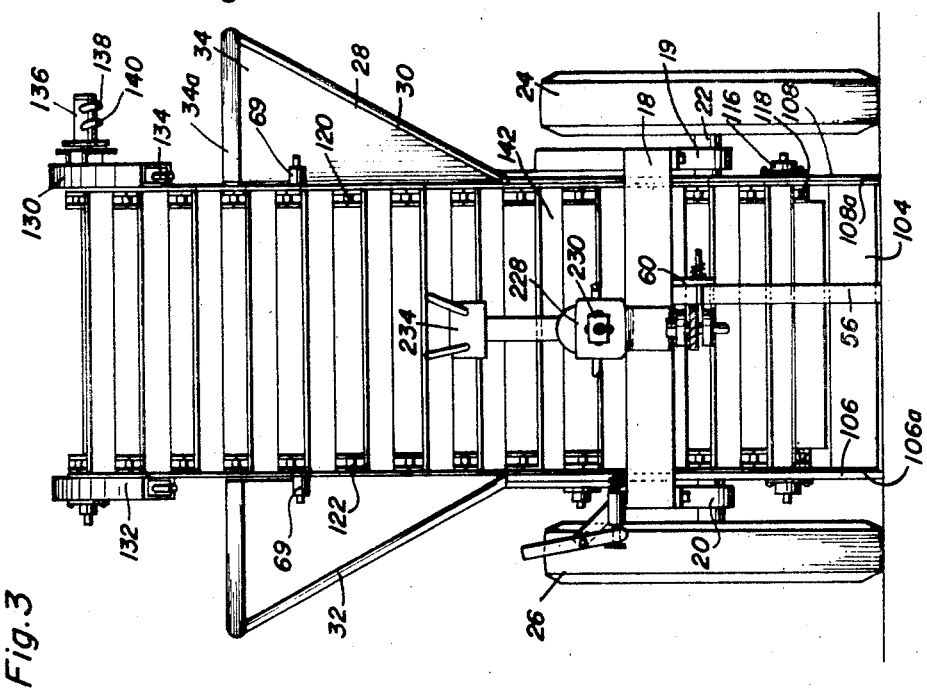
Elvie E. Crimm
INVENTOR.

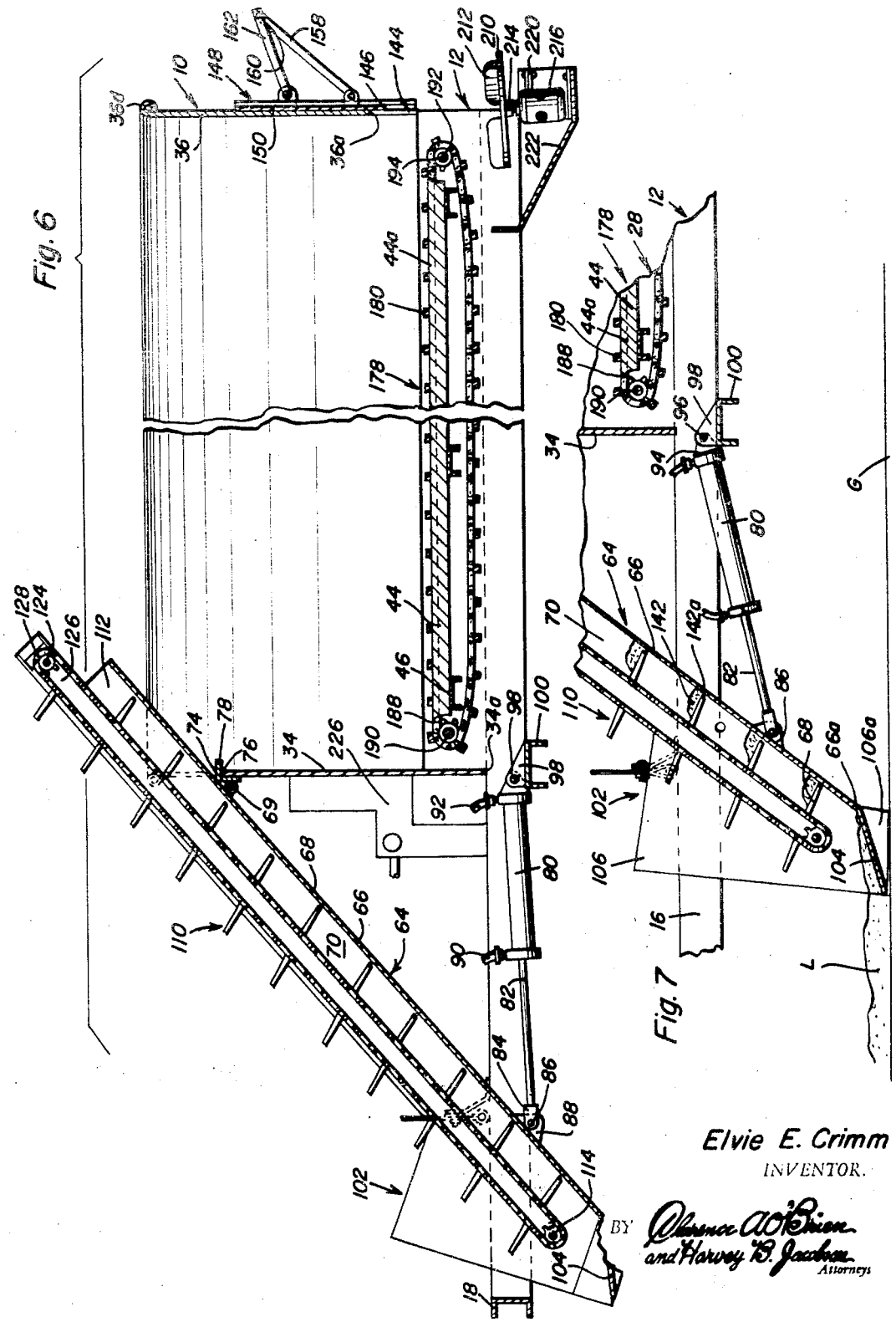

United States Patent Office 3,465,970
Patented Sept. 9, 1969

3,465,970
SELF-LOADING AND UNLOADING LITTER SPREADER
Elvie E. Crimm, 103 Highway 35 S.,
Forest, Miss. 39074
Filed Feb. 15, 1967, Ser. No. 616,362
Int. Cl. A01c *17/00;* B60p *1/38*
U.S. Cl. 239—651                       6 Claims

ABSTRACT OF THE DISCLOSURE

A powered machine for gathering, elevating, storing and selectively distributing material, such as fertilizing poultry litter. The gathering and elevating is effected by an elongated conveyor mounted within a trough, the upper end of which is communicated with a mobile storage bin and the lower end of which is vertically movable to receive the litter. The bin contains means for selectively moving the litter rearward and discharging the litter onto distributing fans for a spreading thereof.

---

This invention generally appertains to improvements in self-loading and unloading devices for loose material, particularly agricultural devices or machines for loading and distributing material, and more especially relates to novel improvements in a self-loading and unloading device for clearing out litter in poultry houses and spreading the poultry litter over a ground area.

The provision of machines for loading and distributing material, which essentially comprise a scooping and elevating means at the forward end of a material confining body, which is mounted on the mobile frame, and a conveying means in the body for conveying the material deposited therein to an outlet means and scattering means operatively underlying the outlet means, is known, particularly in the agricultural field. However, such machines have structural and operational drawbacks, the principal ones being that the various operational structures, which constitute the self-loading and unloading means, in relationship to the material confining body or bin, are not easily operated and controlled and, in particular, are not controlled by a single, easily actuated control means, whereby there is a coordinated and synchronized operation of such structural features. Further, the known devices are unduly structurally complicated, with regard to the construction and operation of the various self-loading and unloading features.

Accordingly, an important object of the present invention is to provide a simple, efficient and compact self-loading and unloading device, whereby all of the operational components, which render the device self-loading and unloading, are controlled in their operation by a single control means for selective activation of the actuating means associated structurally with the various operational components.

A further important object of the present invention is to provide a mobile self-loading and unloading device for material, whereby material may be picked up at one locale by the device, transported to another locale, and then distributed over the area of the latter locale, the entire operation being carried out by hydraulically actuated means which are in operative conjunctive relation with a hydraulic system on the device and which are controlled by a single valve means in the hydraulic system so that the actuating means are selectively activated.

Another important object of the present invention is to provide a self-loading and unloading device of the foregoing type, wherein all of the operating components are hydraulically actuated and the actuation thereof is under the control of a valve means in a hydraulic system carried by the device, the hydraulic system including a hydraulic pump which is adapted to be operatively coupled to a power takeoff of a traction vehicle utilized for drafting the device from one locale to another.

A further important object of the present invention is to provide a novelly constructed, mounted and operated self-loading means in structural and functional association with a mobile material confining body.

A further important object of the present invention is to provide a compact, sturdy and efficient poultry litter spreader for clearing out litter in poultry houses by virtue of its movement through the poultry house, and for transporting the litter to a field area and spreading or scattering the litter over the field area as part of the unloading of the device, all of such operations being carried out by a hydraulically actuated means under the selective control of a valve means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a device constructed in accordance with the present invention;

FIGURE 2 is a side elevational view thereof;

FIGURE 3 is a front elevational view thereof;

FIGURE 4 is a vertical, transverse cross-sectional view taken substantially on line 4—4 of FIGURE 1;

FIGURE 5 is a rear elevational view thereof;

FIGURE 6 is a longitudinal, vertical sectional view taken substantially on line 6—6 of FIGURE 1;

FIGURE 7 is an enlarged, detail sectional view of the material carrier on the forward end of the device and showing the same in use for scooping up and elevating material;

FIGURE 8 is a schematic view of the drive system; and

FIGURE 9 is an enlarged detail taken substantially on line 9—9 of FIGURE 1.

Referring now more particularly to the accompanying drawings, the self-loading and unloading device, generally designated by the numeral 10, is particularly designed for clearing out litter in poultry houses and conveying the litter to a ground area and then spreading or scattering the litter over the ground area, so that the litter is used as a mulch or fertilizer. However, it is to be understood that the device can be used in connection with any material for the purpose of scooping up material and transporting it to a given area and then discharging it in a scattering or broadcasting manner.

The device 10 comprises an elongated base frame 12, which is composed of longitudinally extending, parallel and laterally spaced side frame or channel bars 14 and 16, which are joined at their forward ends by a transverse front frame bar 18. The side bars 14 and 16 are provided, adjacent their rearward ends, with subjacent journal mounts 19 and 20, that are fastened thereto and support a rotatable axle 22, with ground-engaging wheels 24 and 26 being provided on the extremities of the axle, so as to support the frame for bodily movement, thereby rendering the frame mobile for transportation from one locale to another in the particular specified environmental use. The frame is mobily supported by the ground-engaging wheels 24 and 26 so that it can be pulled through a poultry house to clear out litter and then moved to a chosen ground area for the scattering or distribution of the litter. The frame 12 supports an upstanding bin or hopper 28, which constitutes a material confining body, and which is composed of downwardly and inwardly inclined, flat sides 30 and 32, which are disposed in opposing downwardly converging relation and which terminate in lower edges 30a and 32a. The upper edges 30b and 32b of the side walls are coplanar and are reinforced by being rolled outwardly and inwardly upon themselves, as shown in FIGURE 4. The material confining body 28 further includes substantially perpendicular, flat front and rear walls 34 and 36, which are joined to or integral with the side walls and which have coplanar, reinforced upper edges 34b and 36b. The front wall 34 has a lower edge 34a, which extends down below the lower edges 30a and 32a of the side walls and the rear wall 36 is formed with a discharge means, as will be described. The material confining body is mounted on the side frame bars 14 and 16 by means of straps 38, which are affixed to the outer surfaces of the side walls 30 and 32, at longitudinally spaced points, as shown in FIGURE 2, and which terminate in perpendicular, downwardly extending supporting legs or standards 40 that are suitably affixed or secured to the inner side surfaces of the channel side frame bars 14 and 16, as shown in FIGURE 4.

The material confining body 28 is formed with an open top 42, which constitutes the major end and is provided with a rigid, solid sub-flooring 44, which extends longitudinally between the front wall 34 and the rear wall 36 and has its opposing ends spaced rearwardly from the front wall and forwardly from the rear wall of the body confining member 28. The bottom wall or floor 44 is supported by transverse brace bars 46, which are disposed beneath the solid floor 44 and affixed to the opposing side frame bars 14 and 16, so as to position the floor 44 in a horizontal plane, with the floor having opposing side edges that extend beyond the lower edges 30a and 32a of the inclined side walls, as shown in FIGURE 4.

The mobile frame 22 is adapted to be moved forwardly on the ground-engaging wheels 24 and 26 and, for this purpose, may be self-driven by rendering the wheels 24 and 26 as driving wheels through hydraulic motors or the like. However, for economy sake, it is preferred that the frame 12 be drafted by a draft vehicle, such as a traction vehicle or tractor. Therefore, the front end 18 of the frame is formed with a forwardly projecting tongue 48, which terminates at its outer end in a horizontally disposed apertured clevis 50 that is adapted to receive a vertical pivot pin 52, whereby a hitch or tow bar assembly 54 is connected to the tongue 48. The tow bar assembly 54 is adapted to be connected to a conventional hitch assembly on a tractor or other traction vehicle, which is equipped with a power take-off, for use in powering the pump unit of the hydraulic actuating system for the operating components of the device, as will be described.

When the mobile frame is unhitched from the drafting vehicle, a supporting leg or standard 56 is rendered operative to support the frame at its forward end, the standard or leg 56 being pivotally carried by a supporting structure 60 and being held in raised and lowered positions by a pin assembly 62, as shown in FIGURES 2 and 3.

The mobile frame is adapted to be moved forwardly through a poultry house, for example, so as to clear out litter in the poultry house. For this purpose, the device is provided with self-loading means, which is in the nature of a material carrier 64. The material carrier 64 comprises a channel-like trough 66, which has a closed bottom wall 68 and opposing side walls 70 and 72. The front wall 34 of the material confining body 28 is formed, substantially at its center and equidistantly between the upper edges 30b and 32b of the side walls, with a cutout or opening 74, that has a lower bounding edge 76 reinforced by an angle iron 78, which serves as a bearing and fulcrum support for the bottom wall 68 of the trough, the bottom wall being pivotally secured thereto as at 69, as shown in FIGURE 6.

The trough 66 is pivoted downwardly and rearwardly on the support 78, within the cutout portion 74 in a curvilinear fashion. For such purpose, a hydraulic cylinder 80 is provided and the piston rod 82 of the cylinder has an apertured clevised outer end 84, which is pivotally attached by a pivot pin 86 to a projecting apertured ear 88 centrally provided on the bottom wall 66, adjacent the lower end 66a thereof. The piston (not shown) of the piston rod 82 is workingly disposed in the cylinder 80 and the cylinder is a double-acting cylinder and is provided at its opposing ends with hydraulic conduits 90 and 92, whereby fluid is admitted to the opposing ends of the cylinder for acting on the opposing faces of the piston to move the piston rod inwardly and outwardly of the cylinder.

The closed end of the cylinder 80 is provided with a projecting apertured ear 94, which is pivotally mounted by a pivot pin 96 on an upstanding ear 98, which is formed on a crossbar 100 that is fixed between the side frame bars 14 and 16, as shown in FIGURES 2 and 7.

The lower end of the material carrier 46 is provided with a scooping means 102 for scooping up litter L, as shown in FIGURE 7, with the litter being scooped up by the scooping means 102, as the device is moved forwardly in a poultry house. The scooping means 102 comprises a downwardly and forwardly projecting blade 104, which is formed on the lower end 66a of the bottom wall 66 of the trough and which is disposed transversely between opposing side plates 106 and 108. The side plates are integral with the side walls of the trough and extend forwardly and outwardly therefrom so as to increase, in effect, the dimensions of the side walls of the trough, at the lower end thereof. The plates 106 and 108 extend downwardly so as to have downwardly disposed extensions 106a and 108a, which lie below the underside of the inclined blade 104.

Consequently, the scooping means 102 is essentially comprised of the side plates 106 and 108 and the bottom blade 104, which is disposed at an obtuse angle to the bottom 66 of the trough, and the subjacent plate sections 106a and 108a, which constitute surface supports or guides for the actual scooping blade or plate 104.

The scooping means 102 on the lower end of the material carrier 64 can be disposed in various, selected positions to the ground level G, as shown in FIGURE 7, by virtue of the actuating means, which is composed of the hydraulic cylinder and piston, that are pivotally connected between the frame (or indirectly, the material confining body 28) and the material carrier by virtue of the parallel pivot points 96 and 86, which constitute the pivotal axes for the hydraulic cylinder assembly, such pivotal axes being disposed transversely of the longitudinal axis of the frame and the material confining body 28. The hydraulic cylinder arrangement, when activated in the hydraulic system, as will be described, is operative to swing the material carrier upwardly in a curvilinear fashion about bearing support 78. Therefore, through selective control of the hydraulic cylinder assembly, the scooping means can be positioned in various relation to the ground level G and to the pile of litter L deposited on the ground level G so as to scoop up the litter, in a forcible manner, under the impetus of the forwardly traveling movement of the mobile frame 12. A safety lock device 81 is specifically provided so as to lock the trough 66 in its raised position as noted in FIGURE 2, thus relieving the hydraulic cylinder assembly, the lock device 81 requiring a manual release before the trough 66 can be lowered.

Basically, this safety lock device 81 comprises an elongated lockpin 83 which is slidably received through a hollow cylindrical sleeve 85 rigidly welded transversely across the top of side frame bar 16. The pin 83 has the forward end 87 thereof resiliently biased laterally inward of the side frame bar 16 by means of an expanded coiled spring 89. This forward end selectively projects through an aperture or hole 91 formed in the adjoining side wall 79 of the trough 66 so located as to receive the forward end 87 of the safety lockpin 83 when the trough 66 is in the raised or uppermost position illustrated in FIGURE 2. As will be appreciated, the spring 89 will have one end engaged against the inner end of the sleeve 85 and the other end thereof either affixed directly to the pin 83 immediately rearward of the forward end 87, or engaged behind a suitable collar or the like fixed to the pin 83, the ultimate result of course being the resilient biasing of the pin 83 inwardly for an engagement of the inner end 87 within the trough hole 91 when the trough 66 approaches its uppermost position. The retraction of the pin 83, which is to be effected manually prior to an actuation of the trough 66 by the cylinder assembly 80, 82, is effected by an elongated lever 93. This lever 93 has an intermediate portion thereof pivotally engaged, as at 95, with the outer end of a mounting bar 97 affixed to the side frame bar 16 and projecting laterally outward therefrom. The lower end of the lever 93 is bifurcated as at 97′ with both furcations lying adjacent the opposed sides of the projecting portion of the pin sleeve 85 for engagement against the inner face of an enlarged bearing head 99 provided on the outer end of the pin 83. In this manner, as will be best appreciated from the detail of FIGURE 9, as the upper end of the lever 93 is pushed inwardly toward the trough 66, the lower bifurcated end thereof will pivot outwardly and bear against the enlarged pin head 99. This in turn will effect a retraction of the forward end 87 of the pin 83 out of the aperture 91, this in turn allowing a pivotal movement of the trough 66 as desired. Once the trough 66 swings sufficiently so as to move the pin receiving aperture 91 out of alignment with the pin 83, the hand lever 93 can be released with the forward end 87 of the pin 83 merely riding against the adjacent side of the trough 66 until the trough 66 is again raised to its uppermost position, at which time the safety lock pin 83 will automatically engage and lock within the hole 91.

An elevator conveyor means 110 is operatively disposed in the material carrier and is adapted to receive the litter, which is scooped up by the scooping means 102 and to elevate or transport the litter to the upper discharge end 112 of the trough 68, which overlies the material confining body 28, as shown in FIGURE 2, so as to deposit the material, such as the litter L, into the material confining body 28.

The elevator conveyor means, as shown more particularly in FIGURES 3 and 6, comprises a lower shaft 114, which is mounted transversely of the plates 106 and 108 and which extends therethrough and has its ends rotatably journaled in suitable bearing or journal housings 116, which are provided on the outer side surfaces of the plates, as shown in FIGURE 3. Sprockets 118 are fixed on the shaft 114, adjacent the inner side surfaces of the plates 106 and 108 and traveling, endless chains 120 and 122 are entrained over the sprockets, which constitute idler sprockets. The chains 120 and 122 extend from the lower shaft 114 to an upper, transversely disposed driven shaft 124, which is rotatably journaled between supporting plates 126, which constitute axial prolongations of the side walls 70 and 72, at the upper edge portions thereof, thereby leaving the upper end 112 of the trough open for easy, effective and non-clogging discharge of the material by the elevator conveyor means, carried by the chains and forming a component of the chains for the discharge of the material into the material confining body 28, as shown in FIGURE 6. The shaft 124 carries driving sprockets 128, about which the chains 120 and 122 are entrained. The shaft 124 is mounted in suitable journaling means 130 and 132, provided on the outside of the extension plates 126 and having an adjustment or tightening means 134. The shaft 124 is driven by a hydraulic motor 136, which is connected in the hydraulic system by virtue of flexible conduits 138 and 140. The activation of the hydraulic motor 136 will be henceforth described.

The chains support transversely disposed paddles 142, which have their ends suitable fixed to links of the chains at regularly spaced points. The paddles or blades 142 are disposed transversely between the chains, so that they travel upwardly in the trough, transversely between the side walls, having their free side edges 142a in sweeping contact with the upper or inner surface of the bottom wall 68 of the trough 66 so that the blades, as they pass over the sprockets 118 on the lower shaft 114 scoop up a portion of the litter within the scooping means 102 and carry the litter, as shown in FIGURE 7, upwardly to be discharged from the upper discharge 112 and to be deposited in a free gravitational fall into the material conveying body 28, as shown in FIGURES 6 and 7. The paddles extend substantially the full width of the bottom wall 68 and fill the space between the side walls 70 and 72, as shown in FIGURE 3, so as to be effectively moved upwardly to create moving pockets, as shown in FIGURE 7.

It is contemplated that the frame 12 will be moved through a poultry house with the scooping means 102, under the control of the hydraulic actuating means, constituted by the piston-cylinder arrangement 80 and 82, in scooping relation to the litter L so that the scooping blade 104 scoops up the litter and the litter is confined within the scooping means and builds up to the point where the blades or paddles, as they are carried around by the traveling chains, which are moved in synchronized fashion by the common driving shaft 124, driven by the hydraulic motor 136, pick up the litter and convey it to the discharge end 112 of the trough. The litter is forcibly discharged from the upper discharge end 112 and falls freely into the material confining body 28. When the body 28 is filled, the hydraulic actuating means, composed of the cylinder and piston 80 and 82, pivotally interconnected between the frame 12 and the material carrier 64, is activated so as to raise the material carrier to an upper, inoperative, position, as shown in FIGURE 2. At this point, the safety lock 81 engages, and the hydraulic motor 136 is deactivated or rendered inoperative, so as to shut down the elevator means 110.

The frame 12 is then transported by a tractor or other traction vehicle, through the hitch assembly and appurtenant drafting connection means, to a ground area, which can be at any point remote from the poultry house. The device is then rendered operative and safety lock 81 released for discharging the litter, which has accumulated in the material confining body 28, so as to spread the litter over a large ground area, thereby utilizing the litter as a fertilizer or mulch for the ground.

In this respect, after the mobile frame 12 has been moved to an outdoor locale for unloading by means adapted to move the mobile frame when the material confining body 28 is filled, such means being the drafting vehicle or, on the other hand, a drive arrangement for the ground-engaging wheels 24 and 26, the litter in the material confining body 28 is forcibly moved by means operatively disposed in the material confining body toward and through an outlet means 144 provided in the rear wall 36. The outlet means 144 essentially comprises an opening 146 in the rear wall, which opening is defined by spacing the lower edge 36a of the rear wall above the floor 44 but associating it, in connection with the upper surface of the floor, so as to confine material within the material confining body in conjunction with a closure means 148 for the opening, the closure means closing off the outlet 146 and being operative to expose the outlet, when it is desired to discharge the litter or other material, within the confines of the body 28.

The closure means 148 comprises a vertically movable door 150, which has its opposing edges slidably mounted in guides 152, formed on the exterior of the rear wall 36, in laterally spaced fashion, as shown in FIGURE 5. The closure wall 150 is slidably disposed within the guides 152 and is provided with rearwardly projecting, laterally spaced ears 154, which are apertured to receive pivot pins 156 for pivotally connecting the ends of operating arms 158 to the door. The outer ends of the arms 158 are pivotally secured by pivot pins 160 to arms 162, which have their inner ends provided with transversely disposed collars 164 that are fixedly circumposed on an operating rod 166. The rod 166 is journaled in bearing supports 167 and has one end provided with a laterally disposed and rearwardly extending handle 168.

Thus, by manually grasping the handle 168, the rod 166 can be rotated to raise and lower the door or closure member 150 in the slide guides 152, through the articulated arm linkage arrangement 158 and 162 and the appurtenant pivot structures. The lever end 168 of the rod 166 is formed with an offset, inwardly directed lug 170, which is adapted to engage locking teeth 172, formed in the outer edge of an annular locking band 174, which has its end flanges 176 fastened to the rear wall 36, whereby the closure member or door 150 can be locked in various positions, with respect to the discharge opening 146.

Conveyor means 178 is operatively disposed in the material confining body for moving the litter forcibly toward the discharge or outlet opening 146. The means 178 comprises a plurality of crossbars, which are adapted to sweepingly slide over the upper surface 44a of the floor, as shown in FIGURE 6, and to thereby force the litter through the opening 146.

The bars 180 are disposed in spaced, uniform relationship transversely of the open bottom of the material confining body 28 and underlie the lower edges 30a and 32a of the side walls, as shown in FIGURE 4, with the bars having opposing flattened or materially reduced ends 180a, that are fixed by pins 182 to the links of endless chains 184 and 186.

The endless chains 184 and 186 are disposed in spaced apart relation and have their forward ends entrained over sprockets 188, which are fixed on a shaft 190, which is suitably journaled in the forward standards 40 of the supporting straps 38 and which constitutes an idler shaft. The chains 184 and 186 are entrained, at their rearward ends, over driving sprockets 192, which are fixed on a driving shaft 194 that is disposed transversely of the frame 12 and suitably journaled in supporting plates 196 and is driven by a hydraulic motor 198.

Thus, actuation of the hydraulic motor 198 renders operative the movement of the conveyor means 178 so as to cause the endless chains 184 and 186 to be driven by the drive sprockets 194 and move over the idler sprockets 190, with the bars 180 in scraping or sweeping engagement with the upper surface 44a of the floor 44 so as to convey the litter, in a forceful and effective manner, to the outlet or discharge opening 146.

Means is provided and is disposed subjacent the outlet means 144 and the rearward end of the conveyor means 178 for receiving the litter and broadcasting or scattering the litter to a considerable extent over a very large area to either side of the mobile frame 12, as the mobile frame is drafted over the ground during the unloading operation. The means comprises a distribution arrangement 200, which includes a transversely disposed, vertical shield 202, that is attached at its ends to supports 204 mounted on the side frame bars 14 and 16 and is disposed transversely of and subjacent the rear wall 86 and the discharge or outlet opening 146 therein. The plate 202 is provided with a centrally disposed triangular divider 206, which is vertically orientated, with respect to the outflow of the material, so that the material is caused to gravitate on the sloping sides of the triangular divider onto rotatable spreader or broadcasting plates 208 and 210. The plates 208 and 210 are annular and are provided on their upper surface with radial vanes 212 and the plates are disposed at a slight angle, relative to a horizontal plane, and are provided on their under surfaces with annular collars 214, which are fixed, as by set-screws, on the driving shafts of hydraulic motors 216 and 218. The hydraulic motors are supported by bracket means 220, which are supported by a supporting plate assembly 222, that is attached to the arms 204 and thereby attached to the frame bars 14 and 16.

When the bin is drafted over a given ground area for the purpose of discharging the litter or other material in the material confining body 28, the material is conveyed by the conveyor means 178, composed of the bars 180 riding on the upper surface 44a of the floor 44 and carried by the driven endless chains 184 and 186, so that the material is forcibly carried from the interior of the material confining body to and through the outlet or discharge opening 146 in the rear wall 36 of the material confining body. The material is forcibly ejected through the controlled outlet means and, by virtue of the distributor plate, the material gravitates onto the rotating spinners or spreader plates 208 and 210 which are mounted on drive shafts for rotation about generally vertical axes, the drive shafts being upwardly and inwardly inclined so as to dispose the plates 208 and 210 at a slight angle to the horizontal. The baffles or vane elements 212, which are provided on the upper surfaces of the plates 208 and 210 aid in distributing the litter, as the plates are rotated by the hydraulic motors 216 and 218.

The mobile frame 12 carries and supports a hydraulic system, generally designated by the reference numeral 224 and shown diagrammatically in FIGURE 8.

With regard to the hydraulic system 224 and the operation of the device, it is to be noted that the hydraulic system includes a reservoir 226, which is carried by the frame and also includes a pump 228, which is connected by a coupling means 230 to the power take-off shaft 232 of the traction vehicle, such as a tractor.

The hydraulic system 224 also includes a control valve means 234, which is carried by the frame, as shown in FIGURE 2, and which is actuated by a hand lever 236 that overlies the hitch assembly and is easily and readily accessible for manipulation. The lever 236 is supported by a brace bar 238, which has a means 240 within which the lever is disposed and which locks the lever in selected positions after manual manipulation thereof.

In use, the mobile frame 12 is drawn by a traction vehicle, such as a tractor, through a poultry house, in the exemplary environmental use of the device 10. As the frame is drawn through the poultry house, the material carrier 64 is disposed in a selected lowermost inclined position, so that the scooping means 102 is substantially at ground level, whereby the blade 104 scoops up the litter L. The material carrier is disposed in such position by virtue of hydraulic pressure on the piston (not shown) of the piston rod 82 through the lines 90 and 92 of the hydraulic cylinder 80, with the valve means 234 being so disposed that the lines 90 and 92 extend, through connecting conduits 92a and 90a with the reservoir 226 and the valve means 234. Therefore, the doube-acting ram or cylinder 80 can be controlled so as to selectively dispose the blade 104 in various relation to the ground level G and the pile of litter L. The hydraulic motor 136 for the material elevator means 110, which is operatively disposed in the channel-like trough 66, is actuated by the fluid pressure from the inlet line 136a and the return line 136b to the reservoir 226. The valve structure 234 is such that the speed of the hydraulic motor 136 can be controlled independent of the actuation of the hydraulic cylinder assembly 80 and 82 and the arrangement is such, as shown in FIGURE 8, that the valve means 234 can be activated to actuate the cylinder 80, while the hydraulic motor 136 is deactivated. This can come about and would occur, when the material carrier is shifted bodily to a raised or inoperative position, as shown in FIGURES 2 and 6, after the material confining body 28 has been completely filled with litter, consequent to movement of the mobile frame through the poultry house.

The entire hydraulic system is then shut down, by virtue of actuation of the valve means and the mobile frame is transported to a desired ground locale where the litter, within the material confining body is to be forcibly ejected or discharged from the body 28 by the conveyor means 178 and is to be discharged onto the spreaders 208 and 210. When the litter in the material confining body 28 is to be discharged, the closure means is manually actuated so that the closure door is raised to a selected height, with respect to the discharge or outlet opening 146 in the rear wall 36, thereby controlling the quantity exit of the material from the material confining body 28. The conveyor means 178 is driven by the hydraulic motor 198, through a suitable gear reduction unit 198a. The hydraulic motor 198 is connected in series with the hydraulic motors 216 and 218 through the conduits 216a and 218a, which lead from the reservoir 226 and from the valve means 234. However, it is to be noted that the speed of the spreader broadcasting plates can be controlled, so that they operate in synchronized fashion and that the conveyor means 178 is driven by the hydraulic motor 198 through the gear reduction unit 198a.

The valve means 234 controls the operation of the hydraulic motors 216 and 218 and the hydraulic motor 198 for the unloading of the litter or other material in the material confining body 28 and the broadcasting or scattering thereof from the mobile frame, as it is drafted over the ground area.

It can thus be appreciated that the device essentially comprises a self-loading means, which is hydraulically actuated, with respect to the scooping means and the material carrier and the bodily movements of the material carrier and the scooping means on the lower end thereof, through the actuation of the hydraulic cylinder-piston arrangement 80 and 82 and that the material is elevated or carried upwardly in the material carrier by the elevator conveyor means 110, which is operated by the hydraulic motor 136. The same may be operated conjunctively or independently and such operation is controlled by the valve means 234 which constitutes a control means for the positioning of the material carrier and its associated scooping means and for the operation of the elevator conveyor means in the material carrier. The material conveyed in the channel-like trough 68 of the material carrier by the conveyor means 110 is discharged from the upper open end 112 and gravitates into the material confining body 28. When the material confining body 28 is filled with material, such as the litter L, then the hydraulic cylinder 80 is actuated through the line 92 so as to extend the piston 82 to its outermost position wherein the material carrier slides rearwardly and upwardly and pivots or fulcrums about the bearing member 78 so as to be disposed in a raised, inoperative position. The frame is then drafted or moved by a traction vehicle, through the hitch assembly, to a suitable or desired ground locale and, at this point, the closure means is manually actuated so that the closure means 148 is operated to open the closure door 150 to the desired extent. The conveyor means 178 is rendered operative by the valve means 234, so that the hydraulic motor 198, through the gear reduction unit 198a, drives the drive shaft for the conveyor means 178 that forcibly moves the litter in the material confining body towards and through the discharge opening.

The distributing plates are disposed subjacent the discharge opening and are rotated by the hydraulic motors 216, 218, consonant with the operation of the conveyor means 178, through the positioning of the valve means 234.

Thus, it can be appreciated that the device 10 is a truly self-loading and unloading device for use in connection with any materials and particularly for use in cleaning poultry houses and utilizing the cleared out litter for fertilizing or mulching purposes. It is composed of a self-loading means which is entirely hydraulically actuated in its bodily positioning and in its elevating action to scoop up and deliver scooped litter or other material into the material confining body 28, by virtue of a selective setting of the master valve means 234, which constitutes a control means for the simultaneous or selective operation of the hydraulic cylinder 80 and the hydraulic motor 136. Further, by virtue of the hydraulic system, which is carried by the device 10, the material is automatically discharged from the material confining body 28 through the action of the conveyor means 178 and is broadcast or scattered for a considerable and effective distance over a chosen ground locale through the operation of the hydraulic motors 216 and 218.

The valve means 234 is carried by the frame and is manually actuated and the hydraulic system includes the reservoir 226 which is carried by the frame and the pump 228, which is also carried by the frame and which is coupled with the power takeoff of the tractor or other traction vehicle.

Thus, a very simple, compact and most effective self-loading and unloading device has been provided, wherein the self-loading and unloading action may be realized and effected in a very simple and expeditious manner and the actions may be controlled through the simple manipulation of the valve means 234 which constitutes a control means for the actuating means of the various components, all of the actuating means being hydraulic actuating means.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self-loading and unloading device for material, such as litter in a poultry house; said device comprising an elongated mobile frame having a forward end and a rearward end, a material confining body mounted on said frame between the ends thereof, loading means operatively disposed at the forward end of the frame for picking up material as the frame moves therethrough and depositing it in to said material confining body, said material confining body having a front wall and a rear wall, said loading means including a material carrier adapted to be orientated in selective inclined positions relative to the material confining body, said material carrier having a lower end provided with scooping means for scooping up material as the mobile frame moves forwardly, an elevator conveyor means operatively disposed in the material carrier for receiving material from the scooping means, carrying it in the material carrier and discharging it into the material confining body, means mounting the material carrier for swinging movement on the front wall of the material confining body about an axis transverse to the longitudinal axis of the mobile frame, means for bodily moving said material carrier so as to dispose the scooping means in selected degrees of operative pickup relation with the material and in a raised inoperative position, control means for said material carrier moving means, said means for moving said material carrier comprising a double-acting hydraulic piston assembly interconnected between the material carrier and the frame for both bodily moving said material carrier and fixedly locking said material carrier against movement in any adjusted position, means for actuating said elevator conveyor means so as to fill the material confining body with material, control means for said elevator conveyor actuating means, means adapted to move the mobile frame when the material confining body is filled to another locale for unloading, said material confining body having an outlet means, means operatively disposed in the material confining body for forcibly moving the material therein toward and through the outlet means, actuating means for said material moving means, control means for said actuating means for the material moving means, material distribution means operatively oriented with the outlet means for broadcasting the material as it exits from the outlet means, actuating means for said distribution means, control means for said last named actuating means, a hydraulic system mounted on and carried by the mobile frame, each of said actuating means being hydraulic operated and being in operative conjunction with said hydraulic system, and valve means in said hydraulic system for selective activation of said actuating means and constituting the control means for the various actuating means.

2. The invention of claim 1 wherein said material carrier comprises an elongated channel-like trough having a flat full length closed bottom wall and laterally spaced upstanding side walls, said elevator conveying means being operatively disposed in said trough and including upper and lower runs, the lower run of said conveyor means directly overlying and paralleling said bottom wall, said conveyor means including perpendicularly extending material moving panels at spaced points therealong orientated so as to extend transversely between the lower run of the conveyor means and the adjacent bottom wall of the trough, said panels terminating at a distance outward from the conveyor means so as to just clear the bottom wall along the lower run of the conveyor means and cooperate therewith in moving scooped up material therealong.

3. The invention of claim 2 wherein said scooping means constitutes a forwardly angled flat continuation of the bottom wall located below and forwardly of the forward end of the conveyor means whereby, upon a forward movement of the mobile frame, material will be engaged by the scooping means and moved upwardly and rearwardly therefrom onto the bottom wall for engagement by the conveyor means panels for continued movement of the material upwardly along the bottom wall in a confined position between the lower run of the conveyor means and the underlying bottom wall.

4. The invention of claim 3 including guides underlying said scooping means for guiding engagement with the ground as the scooping means is moved therealong, said guides being of a height so as to, upon engagement with the ground, position the leading edge of the scooping means substantially at ground level, said double acting hydraulic piston assembly being pivotally engaged with the bottom wall of the trough above the scooping means.

5. In a self-loading device for material which includes a material confining body having a wall portion, a self-loading means comprising a material carrier in the form of an elongated channel-like trough having a flat bottom wall and opposed upwardly extending side walls, said trough having upper and lower end portions, means pivotally mounting the upper end portion of said trough on the wall portion of the material confining body for communication of the upper end of the trough therewith, scooping means carried by the lower end portion of the trough, means for pivotally moving said trough and fixing said trough in a pivotally moved position, and conveyor elevator means operatively mounted in the trough for carrying scooped material therealong for discharge of the material from the upper end portion of the trough into the material confining body, said conveyor elevator means including upper and lower elongated runs, the lower run of said conveyor elevator means paralleling said bottom wall in spaced relation thereover, said conveyor elevator means including laterally projecting material moving paddles at selected points along the length thereof, the paddles projecting outwardly a distance so as to clear the bottom wall along the lower run of the conveyor elevator means and cooperate therewith in moving scooped material therealong in a confined manner, said scooping means constituting a flat forwardly angled continuation of the bottom wall located forward and below said conveyor elevator means whereby engaged material will move upwardly over the scooping means and onto the bottom wall for engagement by the paddles on the lower run of the conveyor elevator means, said means for pivotally moving said trough consisting of a double acting hydraulic cylinder and piston assembly pivotally engaged with and between the material confining body and the bottom wall of the trough adjacent the lower end portion thereof.

6. The invention of claim 5 including lock means independent of the hydraulic cylinder and piston assembly operably associated with the trough for an automatic locking of the trough in a predetermined elevated position upon a movement of the trough to said elevated position by said cylinder and piston assembly.

References Cited

UNITED STATES PATENTS

| | | | |
|---|---|---|---|
| 2,381,892 | 8/1945 | Fees | 214—83.26 |
| 2,368,422 | 1/1945 | Oberkamper | 239—651 |
| 2,660,439 | 11/1953 | Scranton | 239—651 |
| 3,019,025 | 1/1962 | Young | 239—673 |
| 3,185,486 | 5/1965 | Haley | 239—673 |

FOREIGN PATENTS 1,065,100   4/1967   Great Britain.

EVERETT W. KIRBY, Primary Examiner

U.S. Cl. X.R.

15—93, 4; 214—83.26; 239—673